3,311,984
DIPSTICK
Stefan Stux, 15 Rechov Havradim, Tivon, and Abel A.
Aghion, 7 Rechov Ayalon, Haifa, Israel
Filed Apr. 20, 1964, Ser. No. 360,835
5 Claims. (Cl. 33—126.7)

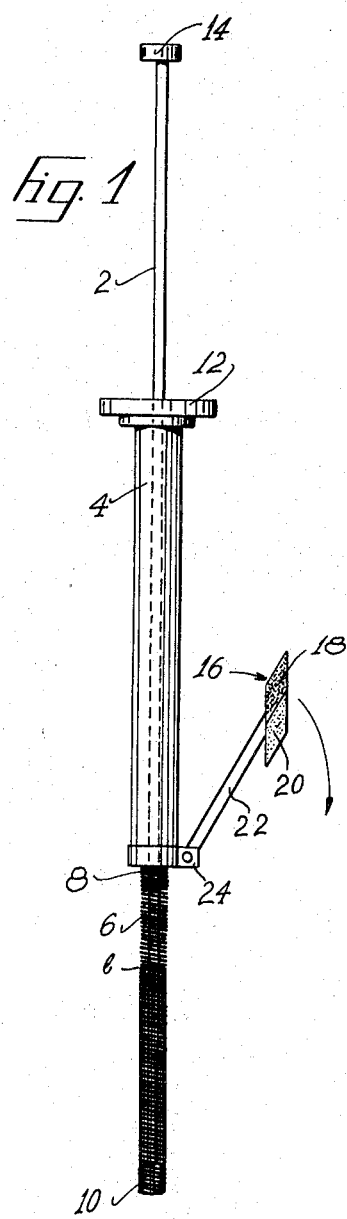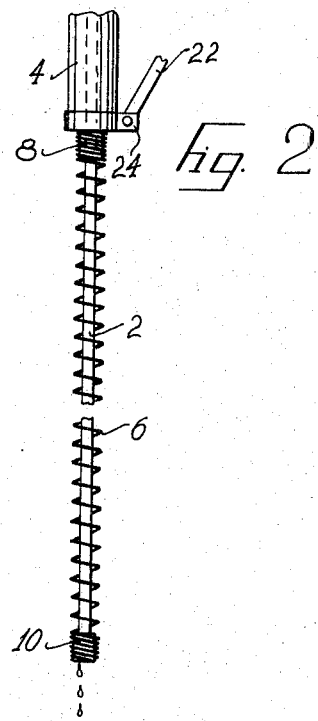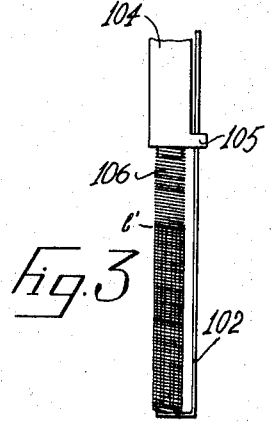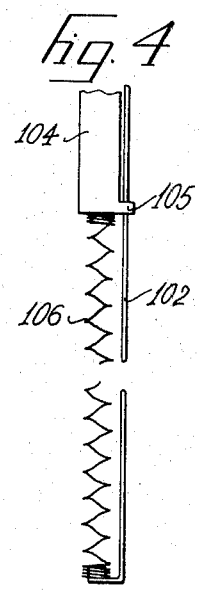
INVENTORS.
STEFAN STUX
ABEL A. AGHION
ATTORNEY United States Patent Office 3,311,984
Patented Apr. 4, 1967

The present invention relates to a dipstick device for measuring liquid levels and condition or color of the liquid if desired, the main object of the invention being to provide a structure which permits "wiping" after each use without the need of a wiper element.

Dipsticks are known in which the measuring element intended for immersion in the liquid is a narrow elongated member having a plurality of capillary openings spaced in the direction of its longitudinal axis adapted to trap and retain liquid when immersed in the liquid. The liquid trapped within the capillary openings thus provides an indication of the level of the liquid.

According to the present invention, the measuring member is made of springy material so as to be deformable upon the application of tension in the direction of its longitudinal axis. The deformation of the measuring member increases the size of its capillary openings sufficient to release the trapped liquid. Thus by the simple operation of pressing down on the lower end of the springy measuring member, the liquid indication is removed, i.e. the dipstick is "wiped" and is restored for reuse.

Other objects and features of the invention will be apparent from the description below.

The invention will now be described with reference to the accompanying drawings which illustrate, by way of example only, two preferred embodiments of the invention. In the drawings:

FIG. 1 illustrates one form of dipstick constructed in accordance with the invention, dipstick being shown in its normal state;

FIG. 2 illustrates a fragment of the dipstick of FIG. 1 in its deformed state;

FIG. 3 illustrates a fragment of a dipstick of another embodiment constructed in accordance with the invention; and FIG. 4 illustrates the fragment of the embodiment of FIG. 3 in its deformed state.

The dipstick illustrated in FIGS. 1 and 2 comprises a rod 2 telescopingly received in a tube 4. The liquid-measuring portion of the dipstick is constituted by a coil spring 6. The top of spring 6 is fixed to a reduced portion 8 at the bottom of tube 4, and the bottom of spring 6 is affixed to a thickened portion 10 at the bottom of rod 2. The top of tube 4 is formed with an annular disc 12 which serves as finger grips for holding the device, and the top of rod 2 carries another smaller-diameter disc 14 which serves as a pressure-applying element.

In operation, the user immerses the dipstick assembly up to a predetermined stop, e.g. disc 12, into the liquid. The device is then withdrawn from the liquid, and it will be seen that the liquid level in the container will be indicated by the level (l) of the liquid trapped and retained within the coils of spring 6. In the normal state of coil spring 6, the coils are spaced sufficiently close to each other to trap and retain liquid therebetween when the spring is immersed in the liquid.

The level of the liquid may now be easily observed by eye, or sensed by an optical measuring instrument, such as a photocell.

When it is desired to "wipe" the liquid from the dipstick, the user merely presses down on disc 14, while holding disc 12 firmly in his hand, which causes the rod to move downwardly within tube 4 e.g. until disc 14 engages disc 12. This deforms (expands) spring 6 so that the spacings between the coils are increased to the point where the trapped liquid is released. The trapped liquid will then drip from the device thereby removing the liquid-level indication and restoring the dipstick for re-use, without the need of a wiper element previously used in such devices.

The dipstick could also be continuously immersed in the liquid, while the dipstick is in the expanded condition of FIG. 2. When it is desired to take a measurement, the stressed condition is released and the dipstick removed with the level indication.

The device in FIGS. 1 and 2 further includes a screen 16 depicting the appearance of the liquid during at least one condition thereof. In this case, the screen 16 is provided with two sections 18 and 20, section 18 depicting the appearance of the liquid (e.g. motor oil) contaminated to the point where it should be discarded, and section 20 depicting the appearance of the same liquid contaminated to the point where it is discretionary whether to discard it or not. Screen 16 is carried on an arm 22 pivotably mounted to a clip 24 slidable over the length of tube 4. The screen is pivotable from an inactive position (as shown in FIG. 1) to an active position proximate to spring 6 so as to facilitate a comparison of the liquid trapped within spring 6 with the screen sections 18 and 20.

FIGS. 3 and 4 illustrate a variation in the device of FIGS. 1 and 2. In the variation of FIGS. 3 and 4, the deformable member is designated 106 and is in the form of a leaf-spring having deformable surfaces arranged in a zig-zag formation for trapping the liquid. The handle portion of the dipstick is indicated by the reference numeral 104, and the pressure-applying element is a rod indicated by the reference numeral 102. Handle 104 is formed with an apertured embossment 105 extending laterally thereof, through which rod 102 passes.

The operation of the device of FIGS. 3 and 4 is substantially the same as with respect to FIGS. 1 and 2. Namely, in the normal condition of leaf-spring 106, the spacings between the leaves are sufficiently close to each other so as to trap and retain liquid therebetween when the member is immersed in the liquid, thereby providing an indication of the liquid level, which in this case is indicated by l' (FIG. 3). To "wipe" the liquid level, for re-use of the device, rod 102 is depressed, whereupon the spacings between the leaves of the spring 106 are increased to the point where the liquid trapped therebetween is released and flows downwardly therefrom (FIG. 4).

In both the foregoing structures, the dipstick may be made in a flexible form (e.g. tube 4 and rod 2 in FIGS. 1 and 2), for use where it must be immersed into the liquid through a bent tube.

To gauge the level, rods 2 or 102 may be marked with level indications.

It is to be understood that the described embodiments of the invention are illustrative only, and that many other embodiments, variations and applications of the invention, or the several features thereof disclosed, may be made without departing from the spirit or scope of the invention as defined in the following claims.

We claim:
1. A dipstick comprising a narrow, elongated member intended for immersion in a liquid for measuring the level thereof, said member having a plurality of capillary openings spaced in the direction of its longitudinal axis adapted to trap and retain liquid therein when said member is immersed in the liquid for providing an indication of the liquid level, characterized in that said member is made of springy material so as to be deformable upon the application of tension in the direction of its longitudinal axis to increase the size of said capillary openings sufficient to release the trapped liquid, thereby removing said indication and restoring said dipstick for re-use, said dipstick further including a first and a second member relatively moveable with respect to each other, the deformable member being secured at its top to the bottom of said first member and at its bottom to the bottom of said second member, the top of said first member including finger grips and the top of said second member including a pressure applying element.

2. A dipstick as defined in claim 1, wherein said deformable member is a coil spring in which the spaces between the coil constitute the liquid trapping capillary openings.

3. A dipstick as defined in claim 1, wherein said deformable member is a leaf spring having deformable surfaces arranged in a zig-zag formation for trapping the liquid.

4. A dipstick as defined in claim 1, wherein said first member is a tube and said second member is a rod telescopingly received in said tube.

5. A dipstick as defined in claim 1, wherein said first member includes an apertured element and said second member is a rod extending through the aperture of said apertured element.

References Cited by the Examiner
UNITED STATES PATENTS

| | | | |
|---|---|---|---|
| 2,127,835 | 8/1938 | Tower | 33—126.7 |
| 2,916,203 | 12/1959 | Griffiths | 33—107 X |
| 3,166,849 | 1/1965 | Chisholm | 33—126.7 |

ROBERT B. HULL, *Primary Examiner.*

LEONARD FORMAN, *Examiner.*

W. K. QUARLES, JR., *Assistant Examiner.*